(12) United States Patent
Matsumoto

(10) Patent No.: US 12,446,763 B2
(45) Date of Patent: Oct. 21, 2025

(54) ENDOSCOPE

(71) Applicant: OLYMPUS MEDICAL SYSTEMS CORP., Tokyo (JP)

(72) Inventor: Koji Matsumoto, Hachioji (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 42 days.

(21) Appl. No.: 18/517,516

(22) Filed: Nov. 22, 2023

(65) Prior Publication Data
US 2025/0160632 A1 May 22, 2025

(51) Int. Cl.
*A61B 1/05* (2006.01)
*A61B 1/002* (2006.01)
*A61B 1/06* (2006.01)

(52) U.S. Cl.
CPC ............ *A61B 1/0623* (2013.01); *A61B 1/002* (2013.01); *A61B 1/0661* (2013.01)

(58) Field of Classification Search
CPC ...... A61B 1/0623; A61B 1/002; A61B 1/0661
See application file for complete search history.

(56) References Cited

U.S. PATENT DOCUMENTS

| | | | | |
|---|---|---|---|---|
| 4,610,513 | A | * | 9/1986 | Nishioka ............ G02B 23/2469 385/119 |
| 5,916,148 | A | * | 6/1999 | Tsuyuki ............. A61B 1/00181 600/175 |
| 10,642,021 | B2 | * | 5/2020 | Heni ....................... A61B 1/055 |
| 2007/0206293 | A1 | * | 9/2007 | Takato ........... G02B 15/143105 359/680 |
| 2009/0287057 | A1 | * | 11/2009 | Murata ............... A61B 1/00096 600/177 |
| 2009/0290236 | A1 | * | 11/2009 | Wang ................... G02B 23/243 359/753 |
| 2017/0131541 | A1 | * | 5/2017 | Sakai .................... G02B 26/103 |
| 2018/0125344 | A1 | * | 5/2018 | Demers .................... A61B 1/07 |
| 2018/0333047 | A1 | * | 11/2018 | Inoue ................. A61B 1/00096 |
| 2018/0341101 | A1 | * | 11/2018 | Heni .................. A61B 1/00193 |
| 2020/0260933 | A1 | * | 8/2020 | Kubo ..................... A61B 1/0638 |
| 2020/0297203 | A1 | * | 9/2020 | Togino ................. A61B 1/0607 |
| 2022/0031145 | A1 | * | 2/2022 | Takahashi .......... A61B 1/00177 |

FOREIGN PATENT DOCUMENTS

JP 2009-276502 A 11/2009

* cited by examiner

*Primary Examiner* — Howard D Brown, Jr.
(74) *Attorney, Agent, or Firm* — Scully, Scott, Murphy & Presser, P.C.

(57) ABSTRACT

An endoscope of the present invention includes a first positive lens configured to concentrate light emitted from a light source onto an internal focus point and to emit the concentrated light to irradiate an object. The focus point is located on an incidence side from an intermediate point on an optical axis of the first positive lens.

8 Claims, 5 Drawing Sheets

ENDOSCOPE

BACKGROUND OF THE INVENTION

Field of the Invention

The present invention relates to an endoscope having an illumination optical system.

Description of Related Art

Endoscopes are desired to have a wide field of view in order to prevent overlooking of target regions for observing and treating the inside of a body cavity of a patient. In order to widen a field of view and to obtain a wide-angle object image, it is essential to widen a viewing angle of an optical lens provided at the most distal end of an endoscope. When light distribution at the periphery of a field of view of an illumination optical system including the optical lens disposed at the most distal end is relatively poor, an actual viewing angle of the illumination optical system becomes narrow. In order to widen the field of view in an endoscope, it is desirable to widen the light distribution in the entire illumination optical system in addition to widening the angle of view in the optical lens disposed at the most distal end.

For example, the endoscope disclosed in Patent Document 1 includes an illumination optical system that faces an output end of a light transmission means from a light source. The illumination optical system includes a lens group having positive refractive power, and an emission side lens that is disposed on the light emission side of the lens group and has a lens function. In the illumination optical system, an incidence side surface of the lens disposed on the light emission side is a spherical surface with a convex surface facing the incidence side, has a lens function, and has a radius of curvature that satisfies predetermined conditions. An emission side surface of the lens disposed on the light emission side in the illumination optical system is preferably a plane. The lens disposed on the light emission side in the illumination optical system is, for example, a ball lens, and since a radius of curvature of the spherical surface satisfies a predetermined condition, a radius of curvature thereof is small, and also, since a spherical surface with strong refractive power is provided over a wide area on the incidence side surface of the lens, and incident parallel light is concentrated at approximately the center of curvature of the spherical surface, diverged and then refracted at the plane on emission side of the lens, the light distribution can be obtained over a wide range. On the other hand, since the light incident on the lens disposed on the light emission side in an illumination optical system in a diverging state and having a path inclined with respect to an optical axis is greatly refracted by the spherical surface and then further refracted by the plane on the emission side of the lens, light distribution can be obtained over a wide range.

PATENT DOCUMENTS

[Patent Document 1] Japanese Unexamined Patent Application, First Publication No. 2009-276502

SUMMARY OF THE INVENTION

Technical Problem

For example, in an endoscope disclosed in Patent Document 1, in an illumination optical system, a focus point of parallel light incident on the lens disposed on the light emission side is located on the emission side from the center of the lens in a direction parallel to the optical axis. Therefore, light density in the lens becomes higher on the emission side than on the incidence side, and a temperature of an emission end surface of the lens tends to rise. When a body fluid such as blood adheres to an emission side surface of a lens disposed on the light emission side in the illumination optical system, the body fluid tends to be fixed to the emission side surface of the lens. As a result, an image observed by the endoscope may be tinged with a color of the body fluid and become dark, or a color distribution different from that of the originally acquired image may occur, resulting in a decrease in clarity of the observed image.

The present invention has been made in view of the above-described problems, and an object thereof is to provide an endoscope that can illuminate a target region for observation, treatment, or the like over a wide area, and can obtain a clear observed image.

Solution to Problem

An endoscope according to an embodiment of the present invention includes a first positive lens configured to concentrate light emitted from a light source onto an internal focus point and to emit the concentrated light to irradiate an object. The focus point is located on an incidence side from an intermediate point on an optical axis of the first positive lens.

Advantageous Effects of Invention

According to the present invention, it is possible to provide an endoscope that can widely illuminate a target region for observation, treatment, or the like, and can obtain a clear observed image.

DETAILED DESCRIPTION OF THE INVENTION

Hereinafter, an endoscope according to an embodiment will be described with reference to the drawings.

First Embodiment

Figure 1:
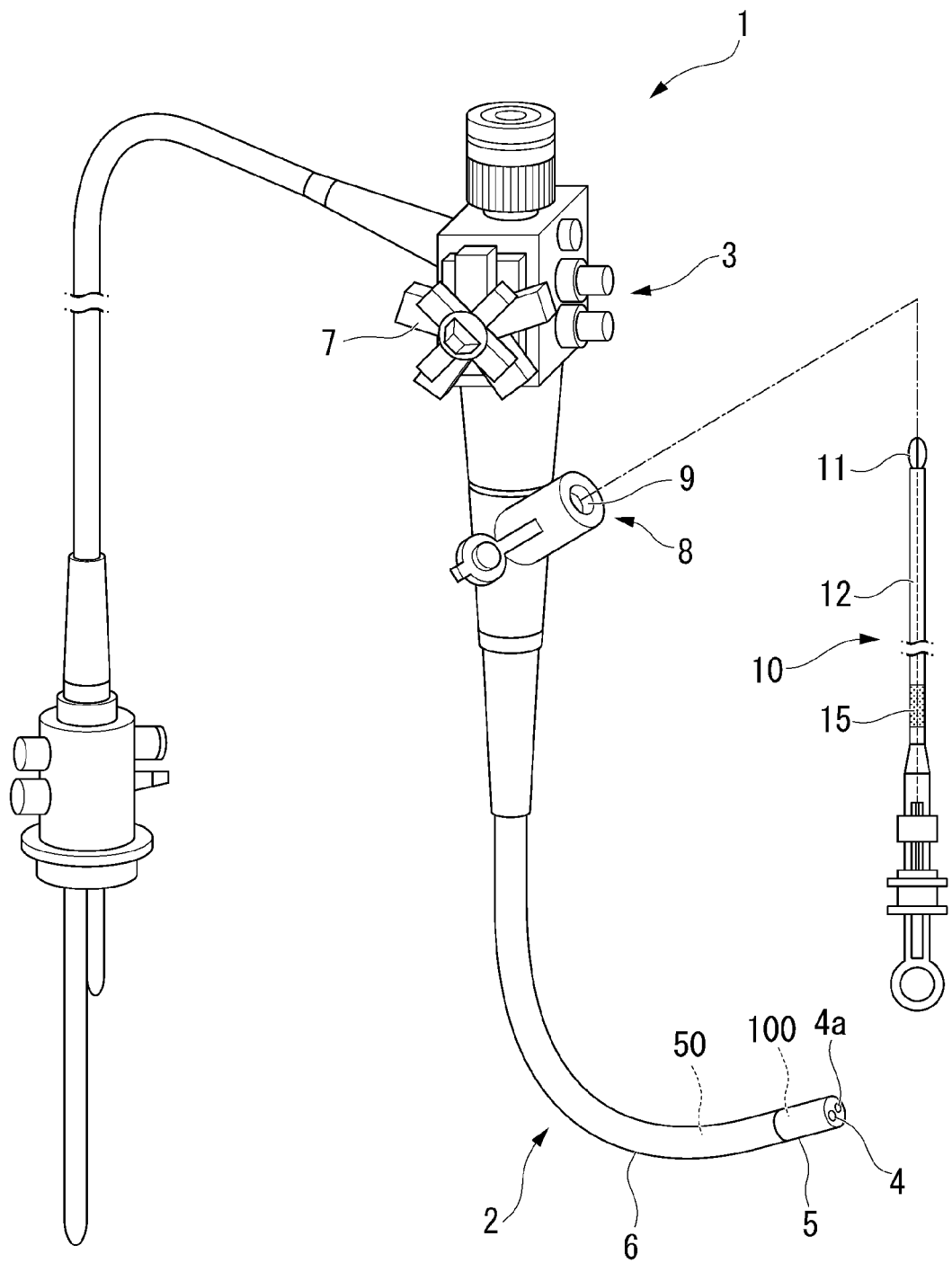
FIG. 1 is a schematic diagram of an endoscope according to a first embodiment of the present invention.

First, a configuration of an endoscope 1 according to a first embodiment will be described. FIG. 1 is a schematic diagram of the endoscope 1 according to the first embodiment. The endoscope 1 is inserted into a body cavity of a patient (not shown) and is used to observe and treat the inside of the body cavity. As shown in FIG. 1, the endoscope 1 includes an insertion part 2 that is inserted into a living body, and an operation part 3 provided on the proximal end side of the insertion part 2.

The insertion part 2 includes, in order from the distal end side to the proximal end side, a rigid distal end portion 4 in which parts and devices for observation or illumination, such as a charge-coupled device (CCD), are built-in, and a tube 6 that can be bent by operating an operation handle 7 provided on the operation part 3. The rigid distal end portion 4 is made of a hard material. A distal end opening through which a treatment tool 10 is inserted so as to be movable forward and backward is provided in an end surface 4a on the distal end side of the rigid distal end portion 4. The tube 6 has flexibility. A treatment tool insertion portion 8 is provided in the tube 6 on the proximal end side of the insertion part 2.

The insertion part 2 is a member that has a long tubular shape and includes a tubular flexible tube connected to a proximal end of the bending portion 5 on the distal end side of the tube 6 at the outermost side thereof. The bending portion 5 is connected to the proximal end side of the rigid distal end portion 4. The bending portion 5 includes an assembly having a tubular shape and including a plurality of bending pieces, and an operation wire that controls an amount of curvature of the assembly of the bending pieces. Through holes or channels through which an imaging device of the rigid distal end portion 4, electrical wiring for supplying power to a light protrusion part, the operation wire of the bending portion 5, and the like are inserted are provided inside the insertion part 2. The rigid distal end portion 4 accommodates an illumination optical system 100 including an objective lens for observing the inside of the body cavity, an imaging means, and the like, a light protrusion part, and the like. The treatment tool insertion portion 8 is connected to the proximal end side of the insertion part 2 and accepts insertion of the treatment tool 10 from outside the body cavity of a patient. An insertion opening 9 as a forceps plug is formed in the treatment tool insertion portion 8.

The operation part 3 is connected to the proximal end of the treatment tool insertion portion 8 and is provided for performing an operation related to observation and treatment of the body cavity of a patient. An operator holds the operation part 3 in his/her hand to operate the endoscope 1A. For example, the amount of curvature of the bending portion 5 can be manipulated, and the imaging means or the light protrusion part in the rigid distal end portion 4 can be manipulated.

Various members having a shaft shape or a linear shape including electrical wiring that supplies power to the imaging means of the rigid distal end portion 4, a light guide 50 that guides illumination light to the light protrusion part, an operation wire that drives the bending portion 5, and the like are disposed inside the endoscope 1 in an axial direction. In FIG. 1, the light guide 50 is omitted. Members that support various members having a shaft shape or a linear shape are disposed on an inner peripheral portion of the endoscope 1. The bending portion 5 and the insertion part 2 are bent when the endoscope 1 is used, and are subjected to various external forces when they slide inside the body cavity. A channel provided inside the insertion part 2 constitutes a conduit through which only the treatment tool 10 passes in order to prevent the bending operation or the like from being hindered due to interference between various members accommodated inside the endoscope 1 and the treatment tool 10.

The insertion opening 9 is formed into a tubular shape. The treatment tool 10 is inserted into the channel of the insertion part 2 through the insertion opening 9. The treatment tool 10 includes, for example, an insertion part configured of a forceps distal end 11 provided on the distal end side, an insertion part having a medical tube 12 and a nut, and an operation part having an operation sliding portion. The operation part of the treatment tool 10 is disposed on the proximal end side of the treatment tool 10. The forceps distal end 11 is a member for collecting and taking out tissue.

In the treatment tool 10, the forceps distal end 11 can be freely switched between an open state and a closed state. The forceps distal end 11 is closed by pulling the operation sliding portion in a direction away from the medical tube 12 in the axial direction. The forceps distal end 11 can be kept in the closed state by rotating the nut. For example, when the treatment tool 10 is inserted into the channel through the forceps plug of the insertion opening 9, the forceps distal end 11 is in the closed state. When tissue is collected and taken out of a patient, the forceps distal end 11 is opened to hold the tissue.

Figure 2:
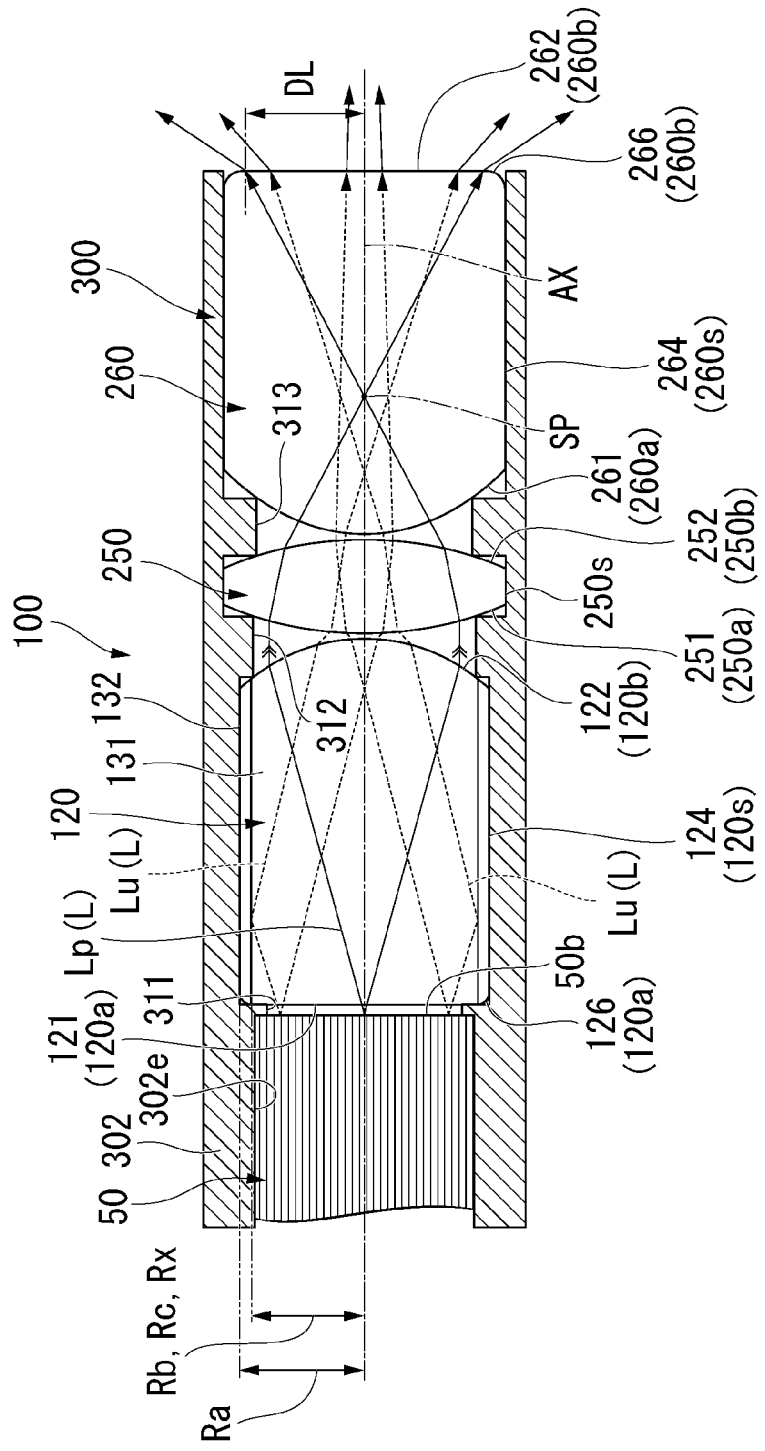
FIG. 2 is a schematic diagram of an illumination optical system of the endoscope in FIG. 1.

FIG. 2 is a schematic diagram of the illumination optical system 100 of the first embodiment. The illumination optical system 100 is an illumination optical system included in the endoscope of the first embodiment, and is accommodated, for example, in the rigid distal end portion 4 of the endoscope 1 shown in FIG. 1. The illumination optical system 100 uniformizes a light distribution of light L emitted from the light guide 50 accommodated in the bending portion 5 of the tube 6 of the endoscope 1, flattens a luminous intensity distribution of the light L, and emits the light L from the end surface 4a of the rigid distal end portion 4 toward a target region for observation and treatment in the body cavity of a patient.

The light guide 50 includes a plurality of light guide fibers, that is, waveguides. Although not shown in FIG. 2, an end surface of the light guide 50 on the incidence side is a surface that includes end surfaces of the plurality of light guide fibers on the incidence side. As shown in FIG. 2, an end surface 50b of the light guide 50 on the emission side is a surface that includes end surfaces of the plurality of light guide fibers on the emission side. An axis of the elongated light guide 50 is parallel to axes of the plurality of light guide fibers. The light guide 50 introduces light emitted from a light source (not shown) accommodated in an appropriate position in the endoscope 1 from an end surface on the incidence side, guides the light toward the end surface 50b along the axis and emits the light from the end surface 50b.

The illumination optical system 100 includes a rod lens 120, a positive lens 250, and a positive lens 260. An optical axis AX of the light L in the illumination optical system 100 is smoothly connected to an optical axis of the light L in the light guide 50, and forms a straight line. The rod lens 120 is provided on the emission side of the light guide 50, and is disposed closest to the incidence side of the light L in the illumination optical system 100.

The rod lens 120 is formed into a columnar shape and includes an end surface 120a on the incidence side, an end surface 120b on the emission side, a side surface 120s, and a lens barrel 300. Preferably, the end surface 120a of the rod lens 120 is disposed with a slight gap from the end surface 50b of the light guide 50 in a direction parallel to the optical axis AX, or is in contact with the end surface 50b in order to introduce all the light L emitted from the light guide 50. The end surface 120a of the rod lens 120 has a circular shape when seen along the optical axis AX. The end surface 120a has a plane 121 perpendicular to the optical axis AX, and a convex curved surface 126 connected to the plane 121 and provided outside the plane 121 in a radial direction. In the rod lens 120, the plane 121 is provided on the incidence side of the light L emitted from the light guide 50. A diameter Ra of the plane 121 centered on the optical axis AX may be equal to a maximum diameter of the end surface 50b of the light guide 50, or may be larger than a maximum diameter of the end surface 50b in order to introduce all the light L emitted from the light guide 50.

The end surface 120b of the rod lens 120 on the emission side has a circular shape when seen along the optical axis AX. The end surface 120b has a convex curved surface 122 with a convex surface facing the emission side. The convex curved surface 122 is provided on the rod lens 120 on the emission side of the light L emitted from the light guide 50. A maximum diameter Rb of the convex curved surface 122 centered on the optical axis AX may be larger than the diameter Ra of the plane 121 centered on the optical axis AX, and may be equal to a diameter Rc of the end surface 120a, or may be larger than the diameter Rc in order to introduce all the light L emitted from the light guide 50.

The side surface 120s of the rod lens 120 connects a peripheral edge of the end surface 120a on the incidence side to a peripheral edge of the end surface 120b on the emission side. The side surface 120s is a cylindrical surface 124 and extends along the direction parallel to the optical axis AX.

A peripheral edge of the plane 121 of the end surface 120a of the rod lens 120 and an end of the cylindrical surface 124 of the side surface 120s on the incidence side are smoothly connected by the convex curved surface 126. In this specification, "smoothly connected" means a state in which two positions are smoothly connected without forming a corner portion. Although it is desirable that no corner portion be formed between the two positions, C-chamfering, that is, a process of cutting a corner of a material diagonally into a flat shape may be performed, and the two positions may be connected by a straight line on a plane. A maximum diameter Rx of the rod lens 120 centered on the optical axis AX is equal to a diameter of a virtual plane of which a peripheral edge is an end of the convex curved surface 126 on the emission side and a virtual plane of which a peripheral edge is an end of the cylindrical surface 124 on the incidence side, and is larger than the diameter Ra of the plane 121. When the illumination optical system 100 is seen from the side, that is, when seen from a cross section including the optical axis AX, the convex curved surface 126 is bent so as to bulge away from the optical axis AX from a virtual line (not shown) that connects a peripheral edge of the plane 121 and an end of the cylindrical surface 124 on the incidence side. That is, a convex surface of the convex curved surface 126 faces the outside of the rod lens 120, that is, the side opposite to the optical axis AX, with respect to a virtual plane that connects an outer peripheral end of the plane 121 centered on the optical axis AX and the end of the side surface 120s and the cylindrical surface 124 on the incidence side.

The end surface 120a of the rod lens 120 on the incidence side is chamfered by providing a convex curved surface 126 at the outermost end of the end surface 120a of the rod lens 120 in the radial direction. In the rod lens 120, since the convex curved surface 126 acts as a reflective surface for the light L propagating inside the rod lens 120, the plane 121 and the convex curved surface 126, that is, the entire end surface 120a on the incidence side acts effectively, loss of the light L incident on the rod lens 120 is reduced, and thus utilization efficiency of the light L is increased.

The rod lens 120 includes a core 131 that includes the optical axis AX and internally propagates the light L, and a cladding 132 that covers the outer periphery of the core 131 and is disposed coaxially with the core 131. That is, the rod lens 120 has a waveguide structure. A refractive index of the cladding 132 at a peak wavelength of the light L is lower than at least a refractive index of the core 131 at the same wavelength.

A diameter of the core 131 of the rod lens 120 centered on the optical axis AX is equal to the diameter Ra of the plane 121 of the rod lens 120, or is larger than the diameter Ra in order to introduce all the light L emitted from the light guide 50. An outer peripheral surface of the cladding 132 constitutes the side surface 120s of the rod lens 120. An inner diameter of the cladding 132 is equal to the diameter Ra. An outer diameter of the cladding 132 is equal to the diameter Rc of the end surface 120a of the rod lens 120.

The core 131 of the rod lens 120 is made of, for example, a material having a high refractive index in which impurities such as germanium oxide ($GeO_2$) and titanium oxide ($TiO_2$) are added to quartz. An amount of impurities in the material having a high refractive index for the core 131 is appropriately set so that the light L is totally reflected at an interface between the core 131 and the cladding 132 and a critical angle satisfies a predetermined angle condition. The cladding 132 is made of, for example, quartz to which no impurities are added. The rod lens 120 can be manufactured through the same manufacturing process as that of known optical fibers. The rod lens 120 may be manufactured, for example, by cutting a portion into a columnar shape with a length equal to a length of the rod lens 120 from a base material manufactured in a known manner using the same material and diameter as those constituting each of the core 131 and the cladding 132, processing or polishing one end surface of the cut out member as the end surface 120a of the rod lens 120, and processing or polishing the other end surface of the cut out member as the end surface 120b of the rod lens 120.

The positive lens 250 is provided on the emission side of the rod lens 120 in the illumination optical system 100. The positive lens 250 has positive refractive power and is, for example, a biconvex lens. An end surface 250a of the positive lens 250 on the incidence side is a convex curved surface 251 that has a convex surface facing the incidence side and protrudes toward the incidence side. An apex of the convex curved surface 251 of the end surface 250a on the incidence side of the positive lens 250 is spaced apart from an apex of the convex curved surface 122 of the end surface 120b on the emission side of the rod lens 120 on the optical axis AX and is disposed with a gap therebetween. However, in order to simplify the assembly of the positive lens 250, the apex of the convex curved surface 122 and the apex of the convex curved surface 251 may be in contact without any gap. A radius of curvature of the convex curved surface 251 of the positive lens 250 may be larger than a radius of curvature of the convex curved surface 122 of the rod lens 120, for example. An end surface 250b of the positive lens 250 on the emission side is a convex curved surface 252 that has a convex surface facing the emission side and protrudes toward the emission side. The apex of the convex curved surface 251 and the apex of the convex curved surface 252 of the positive lens 250 are disposed on the optical axis AX, and are at the same position as the center of the plane 121 of the rod lens 120 and the apex of the convex curved surface 122. The radius of curvature of the convex curved surface 252 of the positive lens 250 may be equal to the radius of curvature of the convex curved surface 251, for example.

A diameter of the positive lens 250 centered on the optical axis AX, that is, a diameter of each of the end surfaces 250a and 250*b*, and a maximum diameter of each of the convex curved surfaces 251 and 252 are larger than the diameter Rc of the end surface 120*a* of the rod lens 120 and the maximum diameter Rb of the convex curved surface 122. The diameter of each of the end surfaces 250*a* and 250*b* of the positive lens 250 may be equal to the diameter Rc of the end surface 120*a* and the maximum diameter Rb of the convex curved surface 122. The side surface 250*s* of the positive lens 250 connects a peripheral edge of the end surface 250*a* on the incidence side and a peripheral edge of the end surface 250*b* on the emission side, and extends in the direction parallel to the optical axis AX. However, the positive lens 250 is a thin lens and only needs to be able to exert positive refractive power on the incident light L, and the peripheral edge of the end surface 250*a* and the peripheral edge of the end surface 250*b* may be connected.

The positive lens 250 is provided on the incidence side of the positive lens 260 which will be described next. The positive lens 250 relays the light L emitted from the rod lens 120 and causes the light L to be incident on the positive lens 260.

The positive lens 260 is provided on the emission side of the positive lens 250 in the illumination optical system 100 and is disposed closest to the emission side of the light L in the illumination optical system 100. The positive lens 260 has positive refractive power and is, for example, a plano-convex lens. An end surface 260*a* of the positive lens 260 on the incidence side is a convex curved surface 261 with a convex surface facing the incidence side. An apex of the convex curved surface 261 of the end surface 260*a* on the incidence side of the positive lens 260 is spaced apart from an apex of the convex curved surface 252 of the end surface 250*b* on the emission side of the positive lens 250 on the optical axis AX, and is disposed with a gap therebetween. However, in order to simplify the assembly of the positive lens 260, the apex of the convex curved surface 252 and the apex of the convex curved surface 261 may be in contact with each other without any gap. A radius of curvature of the convex curved surface 261 of the positive lens 260 may be smaller than the radius of curvature of each of the convex curved surfaces 251 and 252 of the positive lens 250, for example.

An end surface 260*b* of the positive lens 260 on the emission side has a plane 262 orthogonal to the optical axis AX, and a convex curved surface 266 connected to the plane 262 and provided outside the plane 262 in the radial direction. An apex of the convex curved surface 261 and a center of the plane 262 of the positive lens 260 are disposed on the optical axis AX, and are at the same positions as the center of the plane 121 and the apex of the convex curved surface 122 of the rod lens 120.

The side surface 260*s* of the positive lens 260 connects peripheral edges of the end surface 260*a* on the incidence side and the convex curved surface 261 and a peripheral edge of the end surface 260*b* on the incidence side, that is, a peripheral edge of the convex curved surface 266 on the incidence side. The side surface 260*s* is a cylindrical surface 264 and extends along the direction parallel to the optical axis AX.

A peripheral edge of the plane 262 of the end surface 260*b* of the positive lens 260 and an end of the cylindrical surface 264 of the side surface 260*s* on the emission side are smoothly connected by the convex curved surface 266. A diameter of the positive lens 260 centered on the optical axis AX is equal to a maximum diameter of the convex curved surface 261 on the incidence side and is larger than a diameter of the plane 262. When the illumination optical system 100 is seen from the side, that is, when seen in a cross section including the optical axis AX, the convex curved surface 266 is bent so as to bulge away from the optical axis AX from a virtual line (not shown) that connects the peripheral edge of the plane 262 and the end of the cylindrical surface 264 on the emission side at the shortest distance. That is, the convex curved surface 266 faces the outside of the positive lens 260, that is, the side opposite to the optical axis AX with respect to a virtual plane VP that connects an outer peripheral end of the plane 262 and the end of the cylindrical surface 264 on the emission side as shown in FIG. 2.

Each of the positive lenses 250 and 260 is made of, for example, the same optical material as an optical lens. Examples of the material for the positive lenses 250 and 260 include optical glass, quartz, and the like.

The lens barrel 300 is a member formed in a substantially cylindrical shape and has a main body 302 and a plurality of protrusions 311. The main body 302 is formed into a substantially cylindrical shape, and an end of the light guide 50 on the emission side, the rod lens 120, and the positive lenses 250 and 260 are accommodated in an internal space of the main body 302. The plurality of protrusions 311, 312, and 313 are provided on an inner peripheral surface 302*e* of the main body 302 from the incidence side to the emission side of the illumination optical system 100 in the direction parallel to the optical axis AX.

The protrusion 311 protrudes radially inward from the inner peripheral surface 302*e* of a region between the light guide 50 and the rod lens 120 toward the optical axis AX in the direction parallel to the optical axis AX. A side surface of the light guide 50 is supported by the main body 302 on the incidence side of the light L from the protrusion 311, and is in contact with the inner peripheral surface 302*e* of the main body 302 on the incidence side from the protrusion 311, for example. Thus, the light guide 50 is supported by the main body 302 on the incidence side of the protrusion 311 in the radial direction centered on the optical axis AX. The end surface 50*b* of the light guide 50 on the emission side is in contact with an end of the protrusion 311 on the incidence side in the direction parallel to the optical axis AX. A position of the light guide 50 in the direction parallel to the optical axis AX is determined according to the protrusion 311.

The protrusion 312 protrudes radially inward from the inner peripheral surface 302*e* of the region between the rod lens 120 and the positive lens 250 toward the optical axis AX in the direction parallel to the optical axis AX. The side surface 120*s* of the rod lens 120 is supported by the main body 302 between the protrusion 311 and the protrusion 312, and is in contact with the inner peripheral surface 302*e* of the main body 302 between the protrusions 311 and 312, for example. As a result, the rod lens 120 is supported by the main body 302 between the protrusion 311 and the protrusion 312 in the radial direction centered on the optical axis AX. The end surface 120*a* of the rod lens 120 on the incidence side is in contact with the end of the protrusion 311 on the emission side in the direction parallel to the optical axis AX. The end surface 120*b* of the rod lens 120 on the emission side is in contact with the end of the protrusion 312 on the incidence side in the direction parallel to the optical axis AX. A position of the rod lens 120 in the direction parallel to the optical axis AX is determined according to the protrusions 311 and 312.

The protrusion 313 protrudes radially inward from the inner peripheral surface 302*e* of the region between the positive lens 250 and the positive lens 260 toward the optical axis AX in the direction parallel to the optical axis AX. The side surface 250s of the positive lens 250 is supported by the main body 302 between the protrusions 312 and 313, and is in contact with the inner peripheral surface 302e of the main body 302 between the protrusions 312 and 313, for example. As a result, the positive lens 250 is supported by the main body 302 between the protrusion 312 and the protrusion 313 in the radial direction centered on the optical axis AX. The end surface 250a of the positive lens 250 on the incidence side is in contact with an end of the protrusion 312 on the emission side in the direction parallel to the optical axis AX. The end surface 250b of the positive lens 250 on the emission side is in contact with an end of the protrusion 313 on the incidence side in the direction parallel to the optical axis AX. The position of the positive lens 250 in the direction parallel to the optical axis AX is determined according to the protrusions 312 and 313.

The side surface 260s of the positive lens 260 is supported by the main body 302 on the emission side of the light L from the protrusion 313, and is in contact with the inner peripheral surface 302e of the main body 302 on the emission side of the protrusion 313, for example. As a result, the positive lens 260 is supported by the main body 302 on the emission side of the protrusion 313 in the radial direction centered on the optical axis AX. The end surface 260a of the positive lens 260 on the incidence side is in contact with an end of the protrusion 313 on the emission side in the direction parallel to the optical axis AX. The position of the positive lens 260 in the direction parallel to the optical axis AX is determined according to the protrusion 313. The end of the main body 302 on the emission side does not protrude toward the emission side from the end surface 260b of the positive lens 260 on the emission side in the direction parallel to the optical axis AX, and is disposed, for example, at the same position as the end surface 260b.

Each of the protrusions 311, 312, and 313 may be disposed on the inner peripheral surface 302e of the main body 302 in the entire circumferential direction around the optical axis AX, that is, in an annular shape when seen along the optical axis AX, and may be disposed on the inner peripheral surface 302e in a certain region in the circumferential direction. When at least one of the protrusions 311, 312, and 313 is disposed on the inner peripheral surface 302e in a partial region in the circumferential direction, the protrusions are preferably disposed in three or more regions at intervals in the circumferential direction, and the intervals of the three or more regions in the circumferential direction are equal to each other. Thus, postures of the light guide 50, the rod lens 120, and the positive lenses 250 and 260 that are positioned by at least one of the protrusions 311, 312, and 313 are stabilized. In this embodiment, although the protrusions 311, 312, and 313 are provided to fix the respective positions of the rod lens 120 and the positive lenses 250 and 260 in the direction along the optical axis AX, it is possible to fix the respective positions in the direction along the optical axis AX by bringing the light guide 50, the rod lens 120, and the positive lenses 250 and 260 into contact with each other without any gaps.

The side surface of the light guide 50 only needs to be supported by the main body 302 on the incidence side of the light L from the protrusion 311. For example, the side surface of the light guide 50 and the inner peripheral surface 302e of the main body 302 on the incidence side of the protrusion 311 are spaced apart from each other, and an adhesive or a fixing member may be interposed between the side surface of the light guide 50 and the inner peripheral surface 302e of the main body 302 on the incidence side of the protrusion 311. Similarly, the side surface 120s of the rod lens 120 only needs to be supported by the main body 302 between the protrusion 311 and the protrusion 312 in the direction parallel to the optical axis AX. For example, the side surface 120s and the inner peripheral surface 302e of the main body 302 between the protrusion 311 and the protrusion 312 may be spaced apart from each other. In that case, an adhesive or a fixing member may be interposed between the side surface 120s and the inner peripheral surface 302e of the main body 302 between the protrusion 311 and the protrusion 312. The side surface 250s of the positive lens 250 only needs to be supported by the main body 302 between the protrusion 312 and the protrusion 313 in the direction parallel to the optical axis AX. For example, the side surface 250s and the inner peripheral surface 302e of the main body 302 between the protrusion 312 and the protrusion 313 may be spaced apart from each other. In that case, an adhesive or a fixing member may be interposed between the side surface 120s and the inner peripheral surface 302e of the main body 302 between the protrusion 311 and the protrusion 312. The side surface 260s of the positive lens 260 only needs to be supported by the main body 302 on the emission side of the light L from the protrusion 313 in the direction parallel to the optical axis AX. For example, the side surface 260s of the positive lens 260 and the inner peripheral surface 302e of the main body 302 on the emission side of the protrusion 313 may be spaced apart from each other. In that case, an adhesive or a fixing member may be interposed between the side surface 120s and the inner peripheral surface 302e of the main body 302 on the emission side of the light L from the protrusion 313. A material of the fixing member is not particularly limited as long as it is not easily deformed by pressure or the like.

The lens barrel 300 may be divided into two equal portions in the circumferential direction centered on the optical axis AX of the illumination optical system 100 and may be configured with an adhesive or a fixing member (not shown). When assembling the illumination optical system 100, for example, the light guide 50, the rod lens 120, and the positive lenses 250, 260 are installed in a first portion of the lens barrel 300 in accordance with the positions of the protrusions 311, 312, and 313. Then, a second portion of the lens barrel 300 is installed in accordance with the positions of the protrusions 311, 312, and 313 with respect to the light guide 50, the rod lens 120, the positive lenses 250 and 260, and the first portion of the lens barrel 300, and then the first portion and the second portion of lens barrel 300 may be fixed.

Next, the principle and behavior of the light L in the illumination optical system 100 of the endoscope 1 of the first embodiment will be described.

As shown in FIG. 2, in the light L emitted from the end surface 50b of the light guide 50 on the emission side, light Lp emitted from the light guide fiber disposed at the center of the end surface 50b is refracted at the plane 121 of the end surface 120a on the incidence side, is incident on the inside of the rod lens 120 from the plane 121, diverges with respect to the optical axis AX, propagates inside the rod lens 120, and reaches the end surface 120b on the emission side. A length of the rod lens 120 in the direction parallel to the optical axis AX, that is, a distance from the center of the plane 121 of the rod lens 120 to the apex of the convex curved surface 122 is set according to a numerical aperture (NA) of the light guide fiber and a refractive index of the material forming the rod lens 120 so that the light Lp directly reaches the convex curved surface 122 from the plane 121 without being incident on an interface between a core 131 and a cladding 132 of the rod lens 120. In FIG. 2 and the like, only the light Lp that is not incident on the interface between the core 131 and the cladding 132 of the rod lens 120 is shown. However, in reality, there may be a small amount of the light Lp that is incident on the interface between the core 131 and the cladding 132 of the rod lens 120. The light Lp that is incident on the interface is not shown in order to make the description of the present invention easier to understand. The light Lp that has reached the end surface 120b on the emission side is refracted by the convex curved surface 122 of the end surface 120b, and is emitted from the convex curved surface 122 into a space between the rod lens 120 and the positive lens 250 in parallel to the optical axis AX.

The light Lp propagates through a space between the rod lens 120 and the positive lens 250 parallel to the optical axis AX, is refracted by the convex curved surface 251 of the end surface 250a of the positive lens 250, and is incident on the inside of the positive lens 250 from the convex curved surface 251. The light Lp converges with respect to the optical axis AX, propagates inside the positive lens 250, and reaches the end surface 250b on the emission side. The light Lp that has reached the end surface 250b is refracted by the convex curved surface 252 of the end surface 250b, further converges with respect to the optical axis AX, and is emitted from the convex curved surface 252 into a space between the positive lenses 250 and 260.

The light Lp propagates through the space between the positive lens 250 and the positive lens 260, is refracted by the convex curved surface 261 of the end surface 260a of the positive lens 260, and is incident on the inside of the positive lens 250 from the convex curved surface 261. The light Lp further converges with respect to the optical axis AX and is focused on a focus point SP. A conjugate image of the end surface 50b of the light guide 50 on the emission side is formed at the focus point SP. In other words, an image of the light guide fiber of the light guide 50 is transferred to the focus point SP. The light Lp concentrated at the focus point SP of the positive lens 260 diverges from the focus point SP toward the emission side and reaches the end surface 260b of the positive lens 260. The light Lp that has reached the end surface 260b is refracted by the plane 262 of the end surface 260b, further diverges with respect to the optical axis AX, is emitted from the plane 262 to a space on the emission side, and is radiated to a target region for observation and treatment in the body cavity of a patient. A maximum diameter of the light Lp on the plane 262 is DL.

In the light L emitted from the end surface 50b of the light guide 50 on the emission side, light Lu emitted from the light guide fiber disposed outside the end surface 50b in the radial direction centered on the optical axis AX is emitted from the end surface 50b at the same radiation angle as the light Lp in the direction parallel to the optical axis AX, is refracted by a plane 121 of the end surface 120a of the rod lens 120 on the incidence side, and is incident on the inside of the rod lens 120 from the plane 121. Some of the light Lu is reflected by the interface between the core 131 and the cladding 132 of the rod lens 120 and then reaches the convex curved surface 122 of the end surface 120b. The remainder of the light Lu directly reaches the convex curved surface 122 of the end surface 120b of the rod lens 120. Then, the light Lu sequentially passes through the positive lens 250 and the positive lens 260, is sequentially refracted at each of the end surfaces 250a and 250b of the positive lens 250 and the end surfaces 260a and 260b of the positive lens 260, is emitted from the plane 262 of the end surface 260b of the positive lens 260 on the emission side to a space on the emission side of the plane 262, and is radiated onto a target region for observation, treatment, or the like in the body cavity of a patient.

Figure 3:
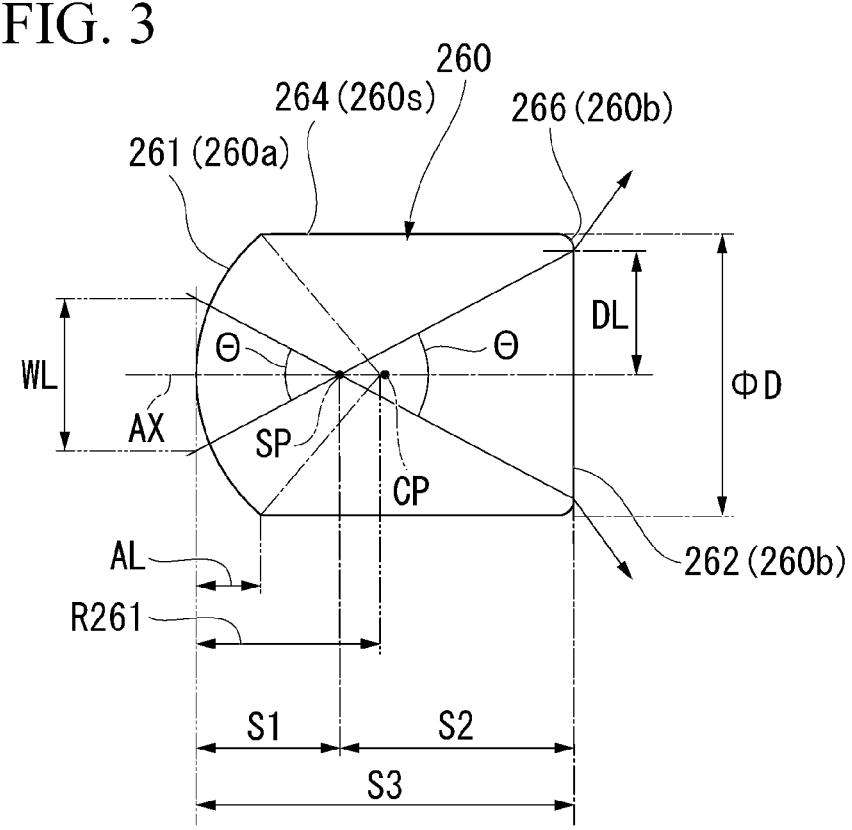
FIG. 3 is a schematic diagram of a positive lens disposed closest to the emission side of the illumination optical system in FIG. 2.

FIG. 3 is a schematic diagram of the positive lens 260. As shown in FIG. 3, in the direction parallel to the optical axis AX, a distance between the apex of the convex curved surface 261 of the end surface 260a of the positive lens 260 on the incidence side and the focus point SP is set to S1. In the direction parallel to the optical axis AX, a distance between the focus point SP and the plane 262 of the end surface 260b of the positive lens 260 on the emission side is set to S2. In the direction parallel to the optical axis AX, a total length of the positive lens 260, that is, a distance between the apex of the convex curved surface 261 and the plane 262 is set to S3. S3=S1+S2. A luminous flux diameter (a diameter) of a principal ray on a surface that is in contact with the end surface 260a of the positive lens 260 on the incidence side and perpendicular to the optical axis AX is set to WL. A width of the positive lens 260 in a surface perpendicular to the optical axis AX, that is, a diameter of the end surface 260b is set to φD. Since the focus point SP is inside the positive lens 260, an incident angle, that is, a convergence angle of the light Lp that is incident on the focus point SP, and an emission angle, that is, a divergence angle of the light Lp emitted from the focus point SP are the same angle, which is an angle Θ.

In the positive lens 260 corresponding to the first positive lens of the illumination optical system 100, the distance S1 is shorter than the distance S2. That is, S1<S2. In the direction parallel to the optical axis AX, when an intermediate point between the apex of the convex curved surface 261 of the positive lens 260 and the plane 262 is CP, the focus point SP is located on the incidence side from the intermediate point CP of the positive lens 260. When the intermediate point CP is at the focus point SP, that is, when the plane 262 is located at a position at a distance S2=S1 on the emission side with respect to the intermediate point CP in the direction parallel to the optical axis AX, the distance S2 is expressed by following Equation (1).

[Equation 1]

$$S2 = \frac{(WL/2)}{\tan(\Theta/2)} \quad (1)$$

Equation (2) shown below can be obtained by transforming Equation (1).

[Equation 2]

$$2 \times S2 = S3 = \frac{WL}{\tan(\Theta/2)} \quad (2)$$

As described above, in the illumination optical system 100 of the endoscope 1 of the first embodiment, since the focus point SP is on the incidence side from the intermediate point CP of the positive lens 260, as shown in Equations (1) and (2), the distance S3 is longer than when the focus point SP is located at the intermediate point CP, and is expressed as shown in following Equation (3).

[Equation 3]

$$S3 > \frac{WL}{\tan(\Theta/2)} \quad (3)$$

Further, since S1<S2, it is preferable that the diameter φD of the end surface 260b is set so that following Equation (4) is satisfied, and a light emitting area is ensured.

[Equation 4]

$$\phi D \geq S2 \cdot \tan(\Theta/2) \quad (4)$$

The positive lens 260 is a thick lens. Since the focus point SP is on the incidence side from the intermediate point CP of the positive lens 260, the maximum diameter DL of the light Lp on the plane 262 is larger than the maximum diameter of the light Lp on the plane 262 when the focus point SP is at the intermediate point CP or on the emission side from the intermediate point CP. Thus, a density of the light Lp at the end surface 260b of the positive lens 260 on the emission side in the illumination optical system 100 adopted in the endoscope 1 of the first embodiment is lower than a density of light at the end surface on the emission side when the focus point SP is located at the intermediate point CP as in a conventional illumination optical system for an endoscope or when the focus point SP is on the emission side from the intermediate point CP.

In the illumination optical system 100 of the first embodiment, it is required that the light L emitted from the end surface 260b of the positive lens 260 disposed closest to the emission side be radiated over a wider range in a target region for observation, treatment or the like within the body cavity of a patient, and that an entire range of an object to be observed be uniformly irradiated. Generally, the emission angle of light emitted from the end surface on the emission side of a light guide for an endoscope is 80° or less. It is assumed that the emission angle of the light L emitted from the end surface 50b of the light guide 50 on the emission side is 80° or less. When the light L is emitted from the end surface 260b of the positive lens 260 on the emission side at an emission angle of 160° or less, a magnification of the illumination optical system 100 is twice. In order to expand an observation range by the illumination optical system 100 and to increase the magnification, the rod lens 120, the positive lens 250 corresponding to the second positive lens of the illumination optical system 100, and the positive lens 260 act.

The illumination optical system 100 is required to have brightness in addition to magnification. In order to increase the brightness of the light L emitted from the end surface 260b of the positive lens 260 of the illumination optical system 100, it is necessary to increase a cross-sectional area of the light guide 50 perpendicular to the optical axis AX and an area of the end surface 50b. On the other hand, since a width of the rigid distal end portion 4 of the endoscope 1 is restricted according to a width of a path within the body cavity of a patient, it is preferably set to a maximum value within a restricted range. Once the diameter of the end surface 50b of the light guide 50 is determined in this way, the diameter and size of each of the rod lens 120 and the positive lenses 250 and 260 are determined. The diameter Rc of the rod lens 120 and the diameters of the positive lenses 250 and 260 that are equal to the diameter Rc are equal to the diameter of the end surface 50b of the light guide 50, or are appropriately larger than the diameter of the end surface 50b of the light guide 50. A cross-sectional area of each of the rod lens 120 and the positive lenses 250 and 260 in a surface perpendicular to the optical axis AX is equal to or greater than the cross-sectional area of the light guide 50, that is, the area of the end surface 50b, and is equal to or greater than the area of the end surface 50b.

Some of the light Lu shown by a broken line in FIG. 2 is reflected at the interface between the core 131 and the cladding 132 of the rod lens 120 and is directed toward the optical axis AX in the radial direction. Whereas the light Lp is concentrated on the focus point SP on the optical axis AX to form a spot, the light Lu is concentrated at a point shifted from the focus point SP in the radial direction perpendicular to the optical axis AX to form a spot. An image of the end surface 50b of the light guide 50 is transferred into a surface perpendicular to the optical axis AX through the focus point of the lights Lp and Lu, that is, the focus point SP. A point on a surface perpendicular to the optical axis AX passing through the focus point SP corresponds to a conjugate point of the end surface 50b of the light guide 50. Therefore, preferably, the end surface 120a of the rod lens 120 which faces the end surface 50b of the light guide 50 has the plane 121 as described above. Thus, loss of the light L emitted from the light guide 50 is reduced.

The convex curved surface 122 of the end surface 120b of the rod lens 120 on the emission side has an effect of expanding an illumination range of the light L that is required for the illumination optical system 100 and is emitted from the end surface closest to the emission side of the illumination optical system 100.

Preferably, the end surface 260b of the positive lens 260 on the emission side, that is, the end surface closest to the emission side in the illumination optical system 100 is configured with the plane 262. Since a convex surface of the end surface 260b does not face the emission side, the apex of the end surface 260b is prevented from unintentionally coming into contact with the object to be observed, and deterioration of the object is prevented. When the apex of the end surface 260b is prevented from unintentionally coming into contact with the object to be observed, the end surface 260b may be a slightly convex or concave curved surface instead of a plane. Instead, the convex curved surface 261 of the end surface 260a of the positive lens 260 on the incidence side cooperates with the convex curved surface 122 of the rod lens 120 and has an effect of expanding the illumination range of the light L emitted from the end surface closest to the emission side of the illumination optical system 100.

The positive lens 250 disposed between the rod lens 120 and the positive lens 260 reinforces the effect of expanding the illumination range of the light L emitted from the illumination optical system 100 which is performed by the convex curved surface 122 of the rod lens 120 and the convex curved surface 261 of the positive lens 260. Since a diameter of the rigid distal end portion 4 of the endoscope 1 is small, the maximum diameter of the illumination optical system 100 is relatively small compared to other illumination optical systems, and when only the convex curved surface 122 of the rod lens 120 and the convex curved surface 261 of the positive lens 260 are used, the effect of expanding the illumination range of the light L emitted from the end surface 260b of the positive lens 260 may be insufficient. The illumination range of the light L emitted from the end surface 260b of the positive lens 260 is expanded favorably by arranging the positive lens 250 between the rod lens 120 and the positive lens 260, compared to a case in which the positive lens 250 is not disposed.

Generally, a magnification rate of the illumination range of the light emitted from the illumination optical system is about 1.0 to 3.0 times. In the illumination optical system 100, preferably, the magnification rate of the illumination range of the light L emitted from the end surface 260b of the positive lens 260 is, for example, 2.0 times or more and 3.0 times or less. A radius of curvature of each of the convex curved surface 122 of the rod lens 120, the convex curved surfaces 251 and 252 of the positive lens 250, and the convex curved surface 261 of the positive lens 260 is appropriately set so that the magnification rate of the illumination range of the light L emitted from the end surface 260b of the positive lens 260 is 2.0 times or more and 3.0 times or less.

In the illumination optical system 100 of the endoscope 1 of the first embodiment, considering the magnification rate of the illumination range of the light L, a minimum value of an angle Θ at which the light Lp is incident on the focus point SP in the positive lens 260 and an angle Θ at which the light Lp emitted from the focus point SP is, for example, 80° at the minimum. A maximum value of the angle Θ is, for example, 140°. The angle Θ is defined by a full width at half maximum (FWHM) of the luminous intensity distribution of the light Lp with respect to the optical axis AX. When the refractive index of the material constituting the positive lens 260 at a peak wavelength of the light Lp is set to n, the following Equation (5) is established.

[Equation 5]

$$80° \leq n \times \Theta \leq 140° \quad (5)$$

Here, an example of a design based on the above-described preferable configuration of the illumination optical system 100 will be given. It is assumed that the emission angle of the light L emitted from the end surface 50b of the light guide 50 on the emission side is set to 80° or less, and the magnification rate of the illumination range of the light L emitted from the end surface 260b of the positive lens 260 is 2.0 times or more and 3.0 times or less. When the refractive index of the positive lens 260 is set with respect to the magnification rate of the illumination range of the light L, a range of a preferable maximum diameter φD of the positive lens 260, a range of a length LL of the positive lens 260 in the direction along the optical axis AX, a range of a thickness AL of the convex curved surface 261 in the same direction, and a range of a radius of curvature R261 of the convex curved surface 261 are determined. That is, the preferable refractive index, the maximum diameter φD, the length LL of the positive lens 260, the preferable thickness AL, and the radius of curvature R261 of the convex curved surface 261 are correlated with each other with respect to the magnification rate of the illumination range of the light L in the illumination optical system 100. In the above assumption, for example, the refractive index of the positive lens 260 is set to 1.85 or more and 2.00 or less. The preferable maximum diameter φD of the positive lens 260 is equal to the diameter WL of the end surface 260b, and is 0.6 mm or more and 3.0 mm or less. The preferable length LL of the positive lens 260 is 0.6 mm or more and 3.0 mm or less within a range approximately equivalent to the maximum diameter φD. The preferable thickness AL of the convex curved surface 261, that is, a preferable distance between the apex and the bottom of the convex curved surface 261 is 0.1 mm or more and 0.6 mm or less. The preferable radius of curvature R261 of the convex curved surface 261 is 1.0 mm or more and 5.0 mm or less.

The endoscope 1 according to the first embodiment described above includes the positive lens (the first positive lens) 260 that concentrates the light emitted from the light source to the internal focus point SP, emits the concentrated light Lp, and radiates it to an object in a target region for observation, treatment and the like inside the body cavity of a patient. The focus point SP is located on the incidence side of the intermediate point CP of the positive lens 260 on the optical axis AX.

In the endoscope 1 of the first embodiment, the density of the light Lp at the end surface 260b of the positive lens 260 on the emission side, that is, an emission surface, is lower than the density of the light Lp at the end surface 260a of the positive lens 260 on the incidence side, that is, an incident surface. Thus, the temperature of the end surface 260b of the positive lens 260, that is, the temperature of the end surface disposed closest to the emission side in the illumination optical system 100 of the endoscope 1 does not become excessively high. Even when body fluids such as patient's blood adhere to the end surface 260b during observation using the endoscope 1, the body fluids are unlikely to adhere to the end surface 260b, and the image observed by the endoscope 1 will not have a color of the body fluids, and thus the observed image does not become dark or the observed image of the endoscope 1 does not become unclear. As a result, according to the endoscope 1 of the first embodiment, it is possible to widely illuminate the target region for observation, treatment or the like, to improve accuracy of the observation and treatment, and to obtain clear observed images.

In the endoscope 1 of the first embodiment, the end surface 260b of the positive lens 260 on the emission side has the plane 262 including the center, and the convex curved surface (the curved surface) 266 that connects an outer peripheral end of the plane 262 and an end of the side surface 260s of the positive lens 260 on the emission side. The convex surface of the convex curved surface 266 faces the side opposite to the focus point SP and the optical axis AX with respect to a virtual plane that connects the outer peripheral end of the plane 262 of the positive lens 260 and the end of the side surface 260s on the emission side.

In the endoscope 1 of the first embodiment, since the convex curved surface 266 is provided on the end surface 260b of the positive lens 260, the light L diverging from the focus point SP is incident at a substantially right angle to a tangent of the convex curved surface 266, and does not diverge radially outward in a space on the emission side from the end surface 260b of the positive lens 260, compared to the light L that diverges from the focus point SP and is incident on the plane 262. Therefore, in the endoscope 1 of the first embodiment, it is possible to reduce a decrease in an amount of light at the outer peripheral end portion in the radial direction centered on the optical axis AX in the luminous intensity distribution of the light L emitted from the end surface 260b of the positive lens 260, and to realize a wide light distribution characteristic of the light L. When instead of the convex curved surface 266, the virtual plane that connects the outer peripheral end of the plane 262 of the positive lens 260 and the end of the side surface 260s on the emission side is a plane, or when the outer peripheral end of the plane 262 is connected to the end of the side surface 260s on the emission side to form a corner portion, the amount of light at the outer peripheral end portion decreases in the luminous intensity distribution of the light L emitted from the end surface 260b of the positive lens 260, unevenness in the amount of light occurs, and the light distribution characteristic of the light L becomes narrow. According to the endoscope 1 of the first embodiment, as described above, it is possible to reduce a decrease in the amount of light L emitted from the end surface 260b of the positive lens 260, to prevent unevenness in the amount of light from becoming apparent, to realize a wide light distribution characteristic of the light L, and to utilize the light L effectively.

The endoscope 1 of the first embodiment includes the light guide 50 that guides the light L emitted from a light source, the rod lens 120 provided on the emission side of the light guide 50, and the positive lens (the second positive lens) 250 provided on the emission side of the rod lens 120 and on the incidence side of the positive lens 260.

In the endoscope 1 of the first embodiment, the light L emitted from the light source is guided by the light guide 50 to the end surface 50b on the emission side, is emitted from the light guide 50, passes through the rod lens 120 and the positive lens 250 in order, and is incident on the positive lens 260. The light L that has been incident on the positive lens 260 is emitted from the end surface 260b of the positive lens 260 on the emission side toward a target region for observation, treatment, or the like inside the body cavity of a patient, and illuminates the target region. While the light L propagates from the incidence side to the emission side in the illumination optical system 100, the light L is sequentially refracted at each of the end surface 50b of the light guide 50, the end surfaces 120a and 120b of the rod lens 120, the end surfaces 250a and 250b of the positive lens 250, and the end surfaces 260a and 260b of the positive lens 260. In the light L, some of the light Lu emitted from the outer periphery of the light guide 50 centered on the optical axis AX is totally reflected, for example, at the interface between the core 131 and the cladding 132 of the rod lens 120.

In the endoscope 1 of the first embodiment, the end surface 120a of the rod lens 120 on the incidence side has the plane 121, and the end surface 120b of the rod lens 120 on the emission side has the convex curved surface 122. The light Lp of the light L emitted from the end surface 120b of the rod lens 120 on the emission side propagates in parallel to the optical axis AX, for example. The end surface 250a of the positive lens 250 on the incidence side has the convex curved surface 251, and the end surface 250b of the positive lens 250 on the emission side has the convex curved surface 252. The end surface 260a of the positive lens 260 on the incidence side has the convex curved surface 261, and the end surface 260b of the positive lens 260 on the emission side has the plane 262. The light Lp of the light L that has been incident on the positive lens 260 is once concentrated at the focus point SP, and then diverges. The light Lu of the light L that has been incident on the positive lens 260 is once concentrated at the same position as the focus point SP in the direction parallel to the optical axis AX and at a position shifted from the focus point SP in the radial direction centered on the optical axis AX, and then diverges. An image of the end surface 50b of the light guide 50 is transferred into a surface perpendicular to the optical axis AX through the focus point SP. In the endoscope 1 of the first embodiment, the length of the rod lens 120 in the direction parallel to the optical axis AX, the length of the positive lens 260 in the direction parallel to the optical axis AX, that is, the distance S3, the radius of curvature of each of the convex curved surfaces 122, 251, 252, and 261, and the like can be appropriately set on the basis of the above-described Equations (3) and (4). According to the endoscope 1 of the first embodiment, it is possible to increase uniformity of the light L emitted from the end surface 260b of the positive lens 260, to satisfactorily reduce the density of the light L emitted from the end surface 260b at the end surface 260b, to increase the magnification rate of the illumination range of the light L to a desired rate, and to illuminate a wider range with the light L from the end surface 260b.

In the endoscope 1 of the first embodiment, the diameter of the positive lens 260 is larger than the maximum diameter (the diameter) Rx of the rod lens 120.

In the endoscope 1 of the first embodiment, it is possible to prevent the light L from being eclipsed at the outer peripheral end portion of the end surface 260b of the positive lens 260 on the emission side, and to obtain a wide light distribution characteristic of the light L by increasing the diameter of the positive lens 260.

Since the length of each of the rod lens 120 and the positive lenses 250 and 260 in the direction parallel to the optical axis AX, the radius of curvature of each of the convex curved surfaces 122, 251, 252, and 261, and the like are set appropriately, even when the light L is emitted from the inner side in the radial direction than the outer peripheral end portion of the end surface 260b of the positive lens 260, the diameter of the positive lens 260 may be the same as that of the rod lens 120 when a wide light distribution characteristic and a radiation range of the light L can be obtained.

The endoscope 1 of the first embodiment includes the positive lens 260. As described above, the positive lens 260 concentrates the light Lp emitted from the light source onto the internal focus point SP, and emits the concentrated light Lp to irradiate the object in the illumination region or the like. An optical density of the light Lp, which is an on-axis luminous flux of the light L, at the end surface (the surface) 260b of the positive lens 260 on the emission side is smaller than an optical density of the light Lp at the end surface (the surface) 260a of the positive lens 260 on the incidence side.

In the endoscope 1 of the first embodiment, the temperature of the end surface 260b of the positive lens 260, that is, the temperature of the end surface disposed closest to the emission side in the illumination optical system 100 of the endoscope 1 does not become excessively high. Even when body fluids such as patient's blood adhere to the end surface 260b during observation using the endoscope 1, the body fluids are unlikely to adhere to the end surface 260b, and the image observed by the endoscope 1 will not have the color of the body fluids, and thus the observed image does not become dark and the observed image of the endoscope 1 does not become unclear. As a result, according to the endoscope 1 of the first embodiment, it is possible to improve the accuracy of observation and treatment and to obtain clear observed images.

Second Embodiment

Next, the configuration of an endoscope and an illumination optical system according to a second embodiment will be described. Although not shown, the endoscope of the second embodiment includes an illumination optical system 102 of the second embodiment in place of the illumination optical system 100 of the first embodiment, and includes the same components as those of the endoscope 1 of the first embodiment other than the illumination optical system 100. In the following, only the different contents of the illumination optical system 102 of the second embodiment from the illumination optical system 100 of the first embodiment will be described. Among the components of the illumination optical system 102 of the second embodiment, components common to those of the illumination optical system 100 of the first embodiment are given the same reference numerals as the corresponding components in the illumination optical system 100 of the first embodiment. Among the components of the illumination optical system 102 of the second embodiment, the description of the components common to those of the illumination optical system 100 of the first embodiment will be omitted.

Figure 4:
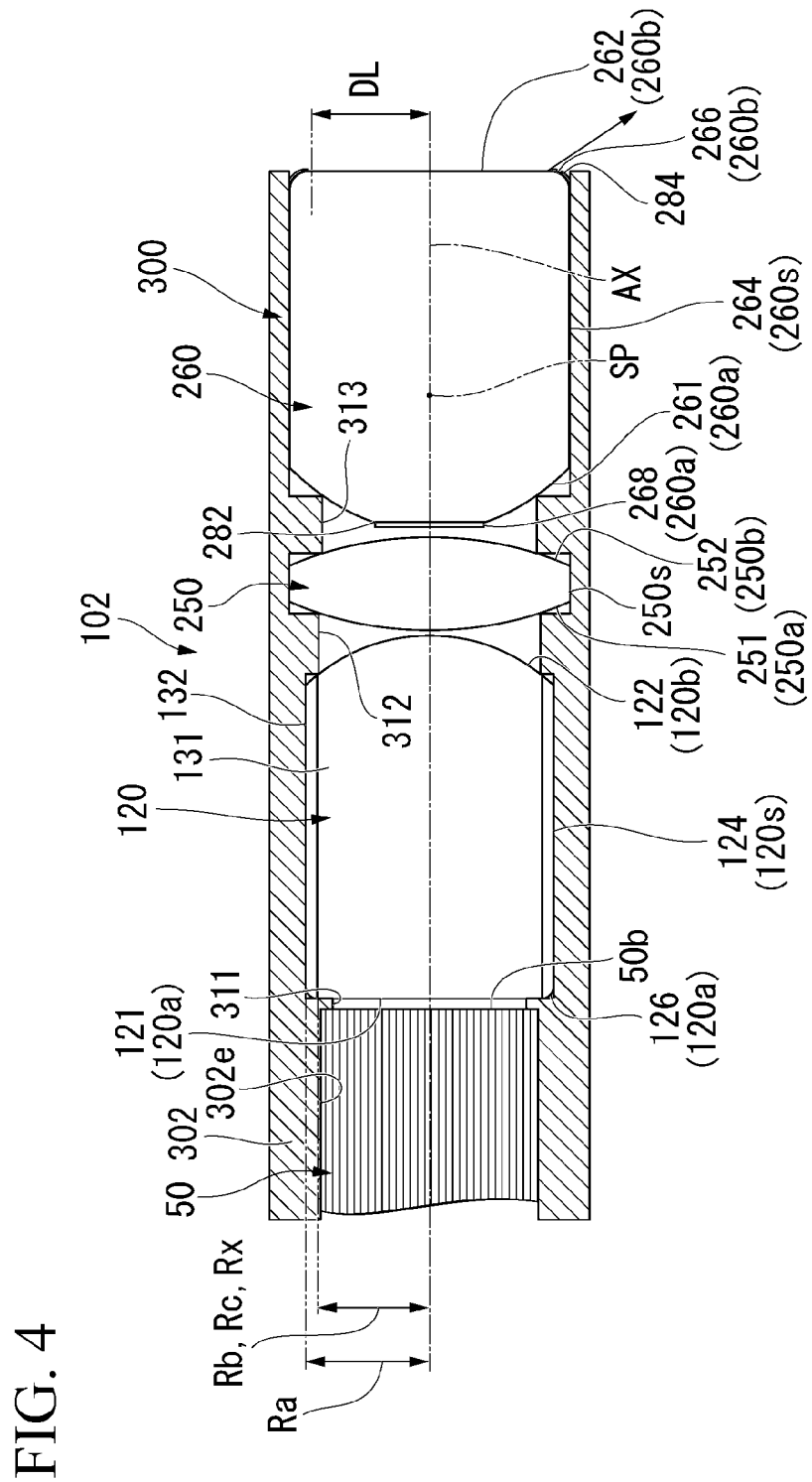
FIG. 4 is a schematic diagram of an illumination optical system included in an endoscope according to a second embodiment of the present invention.

FIG. 4 is a schematic diagram of the illumination optical system 102 of the second embodiment. The illumination optical system 102 includes a rod lens 120, a positive lens 250, a positive lens 260, and a lens barrel 300.

As shown in FIG. 4, in the illumination optical system 102, an end surface 260a of the positive lens 260 on the incidence side has a convex curved surface 261 and a plane 268. The plane 268 is provided at the center of the end surface 260a in the radial direction centered on the optical axis AX. The convex curved surface 261 is disposed outside the plane 268 in the radial direction, and connects an outer peripheral end of the plane 268 and an end of a cylindrical surface 264 of a side surface 260s on the incidence side.

In the illumination optical system 102 of the second embodiment, it is possible to reduce an amount of light in an angular range of, for example, about 0° to 20° that is, a viewing angle range centered on the optical axis AX in the light distribution characteristic of the light L emitted from an end surface 260b of the positive lens 260 by providing a plane 268 at the center of the end surface 260a of the positive lens 260 on the incidence side in the radial direction. In other words, in order to improve the uniformity of the light L, a size of the plane 268 can be determined according to the angular range in which the amount of light is desired to be reduced in the luminous intensity distribution.

In the illumination optical system 102 of the second embodiment, an absorption layer 282 may be provided on the plane 268 of the end surface 260a of the positive lens 260 on the incidence side. The absorption layer 282 absorbs at least some of incident light L. The absorption layer 282 may be configured of, for example, black paint used for optical glass constituting an optical element such as a lens, or a metal. The amount of light L emitted from the end surface 260b of the positive lens 260 in a desired angular range of the light distribution characteristic can be further reduced by providing the absorption layer 282 on the plane 268.

In the illumination optical system 102 of the second embodiment, an absorption layer 284 may be provided on the convex curved surface 266 of the end surface 260b of the positive lens 260 on the emission side. The absorption layer 284 absorbs at least some of the incident light L, and is configured of, for example, the same material as the absorption layer 282 or black paint. It is possible to further reduce a decrease in the amount of light L emitted from the end surface 260b of the positive lens 260, to prevent unevenness in the amount of light from becoming apparent, to realize a wide light distribution characteristic of the light L, and to utilize the light L effectively by providing the absorption layer 284 on the convex curved surface 266.

Third Embodiment

Next, a configuration of an endoscope and an illumination optical system according to a third embodiment will be described. Although not shown, the endoscope of the third embodiment includes an illumination optical system 104 of the third embodiment in place of the illumination optical system 100 of the first embodiment, and includes the same components as those of the endoscope 1 of the first embodiment other than the illumination optical system 100. In the following, only the different contents of the illumination optical system 104 of the third embodiment from the illumination optical system 100 of the first embodiment will be described. Among the components of the illumination optical system 104 of the third embodiment, components common to the illumination optical system 100 of the first embodiment are given the same reference numerals as the corresponding components in the illumination optical system 100 of the first embodiment. Among the components of the illumination optical system 104 of the third embodiment, the descriptions of the components common to the illumination optical system 100 of the first embodiment will be omitted.

Figure 5:
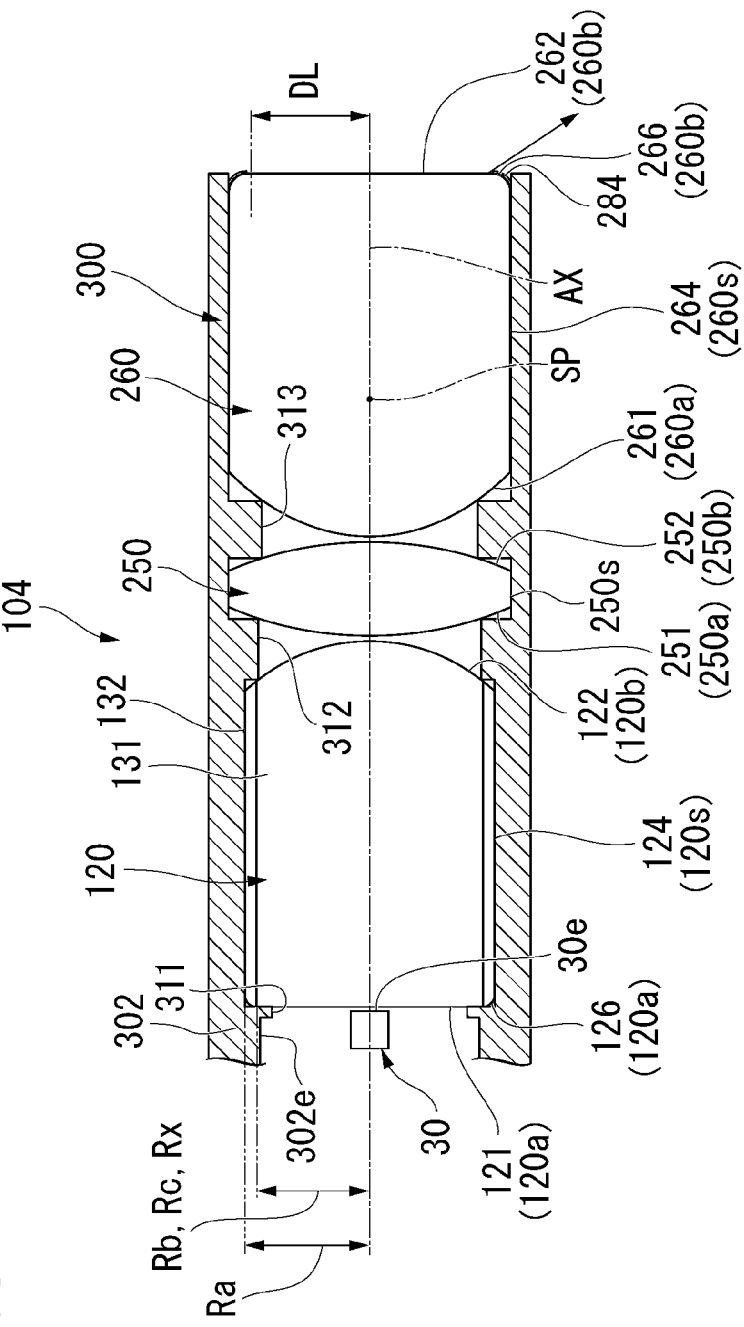
FIG. 5 is a schematic diagram of an illumination optical system included in an endoscope according to a third embodiment of the present invention.

FIG. 5 is a schematic diagram of the illumination optical system 104 of the third embodiment. The illumination optical system 104 includes a light source 30, a rod lens 120, a positive lens 250, a positive lens 260, and a lens barrel 300.

As shown in FIG. 5, in the illumination optical system 104, the light source 30 is disposed on the incidence side of the light L from the rod lens 120, and is disposed on the optical axis AX in the radial direction centered on the optical axis AX. A light emitting surface 30e of the light source 30 faces the end surface 120a of the rod lens 120 on the incidence side, and is preferably in contact with the end surface 120a. The light source 30 is joined to the end surface 120a of the rod lens 120. As the light source 30, for example, a small light source such as a light-emitting diode (LED) or a semiconductor laser (LD) is used. In the illumination optical system 104, a plurality of light sources 30 (not shown) including the light source 30 illustrated in FIG. 5 may be disposed in a surface orthogonal to the optical axis AX. The light source 30 and the light sources (not shown) may also be supported by the main body 302 of the lens barrel 300 through a support member (not shown).

Assuming that the emission angle of the light L emitted from the light emitting surface 30e of the light source 30 is set to 80° or less, the magnification rate of the illumination range of the light L emitted from the end surface 260b of the positive lens 260 is set to 2.0 times or more and 3.0 times or less, and the refractive index of the positive lens 260 is 1.85 or more and 2.00 or less, the radius of curvature R261 of the convex curved surface 261 is preferably 1.0 mm or more and 5.0 mm or less, a preferable length of the convex curved surface 261 in the direction parallel to the optical axis AX, that is, a preferable thickness AL of the convex curved surface 261 is 0.1 mm or more and 0.6 mm or less, and a length of a cylindrical surface 264 is preferably 2.9 mm or less.

In the illumination optical system 104 of the third embodiment, the light source 30 can be provided on the incidence side of the rod lens 120 in place of the light guide 50, and the light source 30 can be joined to the end surface 120a of the rod lens 120, for example. In the illumination optical system 104 of the third embodiment, a radius of curvature of the convex curved surface 122 of the rod lens 120, a radius of curvature of each of the convex curved surfaces 251 and 252 of the positive lens 250, and a radius of curvature of the convex curved surface 261 of the positive lens 260 are each set appropriately according to the emission angle of the light L emitted from the light emitting surface 30e of the light source 30 and the angle Θ of the light Lp that is incident on the focus point SP in the positive lens 260. According to the illumination optical system 104 of the third embodiment, the same effects as those in the illumination optical system 100 of the first embodiment can be obtained.

Although the embodiments of the present invention have been described above in detail with reference to the drawings, the specific configuration is not limited to the above-described embodiments, and the design may be changed as appropriate without departing from the gist of the present invention.

For example, the rod lens 120 of the illumination optical system 100 of the first embodiment and the illumination optical system 102 of the second embodiment described above does not necessarily have a waveguide structure. The rod lens 120 may be made of one type of material having a high refractive index, such as optical glass, for example. Since the material constituting the rod lens 120 has a relatively high refractive index, and there is a sufficient refractive index difference between the material constituting the rod lens 120 and a main body 302 and an internal space of the lens barrel 300, some of the light Lu that has been incident from the end surface 120a of the rod lens 120 on the incidence side is totally reflected by the side surface 120s and propagates through the inside of the rod lens 120. Even in such a configuration, the same effects as those of the illumination optical systems 100 and 102 can be obtained.

For example, in the illumination optical systems 100, 102, and 104 of each of the embodiments described above, when the light L emitted from the light guide 50 or the light L emitted from the light source 30 is concentrated at a focus point SP inside the positive lens 260 at an angle Θ, and the density of the light L emitted from the focus point SP at the end surface 260b of the positive lens 260 can be appropriately reduced, a desired number of optical lenses or optical elements other than lenses may be provided instead of the rod lens 120 and the positive lens 250.

INDUSTRIAL APPLICABILITY

This invention is applicable to an illumination optical system used to guide light emitted from a light source to a target region for observation and treatment within a body cavity of a patient, and an endoscope used for illuminating the target region with the light emitted from the light source and performing observation and treatment.

EXPLANATION OF REFERENCES

1 Endoscope
30 Light source
50 Light guide
120 Rod lens
250 Positive lens (second positive lens)
260 Positive lens (first positive lens)
300 Lens barrel
SP Focus point

What is claimed is:

1. An endoscope comprising:
a light guide configured to guide the light emitted from a light source; and
a first positive lens configured to concentrate light emitted from the light guide onto an internal focus point and to emit the concentrated light to irradiate an object,
wherein the internal focus point is located in a position where a conjugate image of the end surface on an emission side of the light guide is formed; and
the internal focus point is closer to the light guide than an intermediate point between an end surface on an incidence side of the first positive lens and an end surface on an emission side of the first positive lens on an optical axis of the first positive lens.

2. The endoscope according to claim 1, wherein a plane is provided at a center portion of a surface of the first positive lens on the incidence side.

3. The endoscope according to claim 2, wherein an absorption layer which absorbs some of the light that is incident on the first positive lens is provided on the plane.

4. The endoscope according to claim 1, wherein a surface of the first positive lens on an emission side has a plane including a center, and a curved surface that connects an outer peripheral end of the plane and an end of a side surface of the first positive lens on the emission side, and
the curved surface has a convex surface that faces a side opposite to the focus point with respect to a virtual plane that connects the outer peripheral end and the end of the side surface of the first positive lens.

5. The endoscope according to claim 4, wherein an absorption layer which absorbs some of the light that is incident on the first positive lens is provided on the curved surface.

6. The endoscope according to claim 1, further comprising:
a rod lens provided on an emission side of the light guide; and
a second positive lens provided on an emission side of the rod lens and provided on an incidence side of the first positive lens.

7. The endoscope according to claim 6, wherein a diameter of the first positive lens is larger than a diameter of the rod lens.

8. An endoscope comprising:
a light guide configured to guide the light emitted from a light source; and
a first positive lens configured to concentrate light emitted from the light guide onto an internal focus point and to emit the concentrated light to irradiate an object,
wherein an optical density of an on-axis luminous flux on a surface of the first positive lens on an emission side is smaller than an optical density thereof on a surface of the first positive lens on an incidence side.

* * * * *